(No Model.)

J. W. McDONOUGH.
PHOTOGRAPHIC NEGATIVE.

No. 561,687.     Patented June 9, 1896.

Witnesses.
Wm. M. Rheem.
Wm. L. Henning.

Inventor
James W. McDonough
By Banning & Banning &
Sheridan, Attorneys.

UNITED STATES PATENT OFFICE.

JAMES W. McDONOUGH, OF CHICAGO, ILLINOIS.

PHOTOGRAPHIC NEGATIVE.

SPECIFICATION forming part of Letters Patent No. 561,687, dated June 9, 1896.

Application filed September 18, 1895. Serial No. 562,894. (No model.)

*To all whom it may concern:*

Be it known that I, JAMES W. MCDONOUGH, a citizen of the United States, residing at Chicago, Illinois, have invented certain new and useful Improvements in Photographic Negatives, of which the following is a specification.

The object of my present invention is to make a negative or positive photographic picture for the purpose of making a photograph in colors by its means, and to secure an easy and rapid registration of the negative with the paper or material upon which the picture is to be made or printed.

Figure 1:
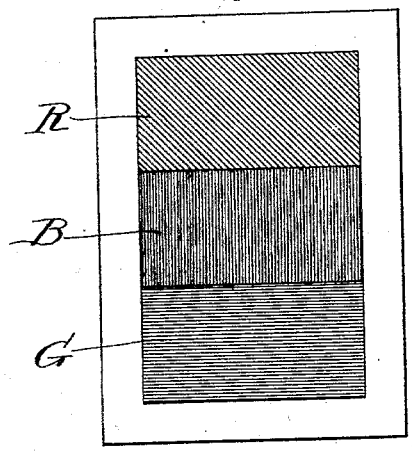
Figure 2:
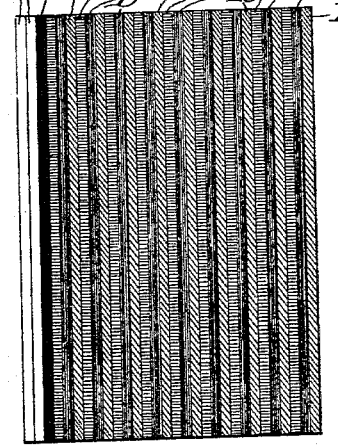
Figure 4:
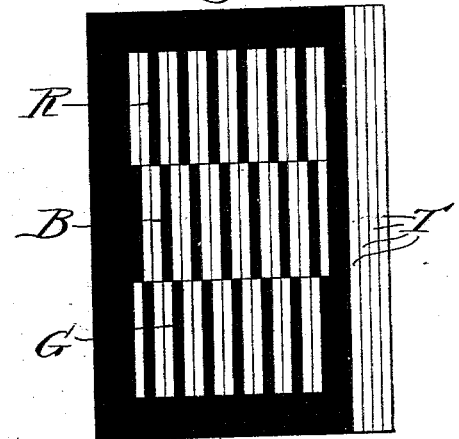
Figure 5:
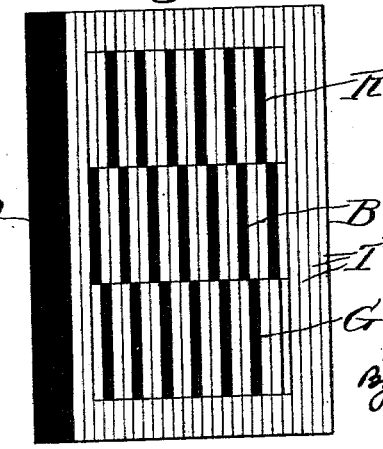

In the drawings, Figure 1 is a plan view of an object to be photographed, which object represents a section of white cardboard, upon which are printed rectangular patches in red, green, and blue, and which is used for sake of simplicity of illustration. Fig. 2 represents a plan view of a magnified section of a multicolored screen from which the negative is produced; and Figs. 3, 4, and 5 represent negatives, showing opaque registering lines produced when the screen is transparent and transparent registering lines produced when the screen is opaque.

Figure 3:
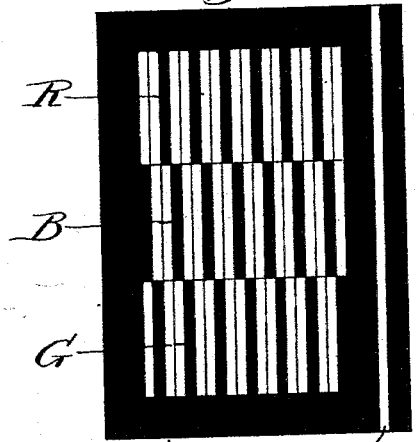

Fig. 3, to more fully and in detail explain what is illustrated in this figure of the drawings, represents a negative taken through the multicolored screen shown in Fig. 2. It is made by placing the screen of such figure in the camera or plate-holder of the camera in such a way as that the sensitive plate upon which the negative picture is to be developed may be placed with the sensitive material or side in close contact with the colored lines of the screen. The screen is placed between the lens and sensitive plate, so that the rays of light from the object to be photographed will pass through the colored lines of the screen before reaching the sensitive plate. The light from a red object, such as shown in Fig. 1 at R, will penetrate the red lines of the screen and impress the sensitive material, but will be absorbed by the blue and green lines of the screen. In like manner the blue and green lines will penetrate the blue and green lines of the screen, but will be absorbed by the others. The plate is developed and a negative produced in lines corresponding to the lines of the screen, but in black and white. Upon the screen illustrated in Fig. 2 is an opaque line O, which takes the place of the red line, and two transparent lines T, which take the place of the blue and green lines. All colored light is cut off by the opaque line and all light transmitted by the transparent lines. Only one series of lines are shown in the screen illustrated in Fig. 2, but they may be extended laterally, so as to cover fifty or more series or, say, one-half inch or more of space, on the multicolored screen. The negative shown in Fig. 3 shows one transparent line T near the right-hand side corresponding to the opaque line O of the screen shown in Fig. 2, and the opaque space to the right of the transparent line T in Fig. 3 corresponds to the transparent space of the screen of Fig. 2. The negative shows a series of opaque lines R in Fig. 3, corresponding to the action of light from the object at R in Fig. 1, a series of lines B, corresponding to the action of light from the object at B in Fig. 1, and a series of lines G, corresponding to the action of the light from the object at G in Fig. 1. The negative shown in Fig. 4 shows the effect produced by a screen upon which all colored lines are opaqued in a certain space and extending to a certain line—say G. The first line in the transparent space T of Fig. 4 represents the colored line next to G. The negative shown in Fig. 5 shows the effect produced by a screen upon which all colored lines are left transparent in a certain space extending to a certain line— say G. The first line in the transparent space at the right represents the colored line next to G.

The negatives used by me may be produced in various ways. I do not deem it necessary to describe all ways, but will describe several which will serve as illustrations of others and of the method employed.

In making a negative by the method which I prefer to describe I take a multicolored screen or plate, which is provided with different colored transparent substances arranged according to regular recurring patterns—as dots, lines, figures—in such proportions and of such colors and degrees of size as will present to the eye a neutral tint, the lines of such patterns to be, say, yellowish red, (represented by R,) yellowish green, (represented by G,) and violet-blue, (represented by B,) ruled or printed, say, three hundred lines to the inch. A portion or portions of the screen is treated by opaquing a line, figure, or pattern, leaving others of the same portion transparent, or opaquing a line and leaving other lines of the same portion of the original color. I may also, if I find it desirable, leave blank or transparent a line or lines of a portion of the screen, or opaque a portion of the screen. These portions may be regular or irregular patches, or may be extended along the entire side or sides of the screen. In all these cases where there is a transparent or opaqued line or pattern, patch, or hole, such portion forms a fixed or invariable and distinctive characteristic or peculiarity, which is reproduced in the sensitive material of the plate applied to the screen, and which serves as a guide or mark to determine the position of the parts in effecting registrations thereof.

In order to still further describe the use of the screen and to show the method of registering, I will take the case of a screen where a series of red lines in a portion running the entire length of the side of the screen—say of the width of half an inch—are opaqued, and the green and blue omitted. Of course any other colored lines might be selected to be opaqued, if preferred. In this space fifty red lines are covered and one hundred other alternated lines left blank, supposing that three hundred lines are used to the inch. This screen may be placed in the camera in contact with an orthrochromatic dry-plate, in such position that the light from the object to be photographed will pass through the multicolored screen to affect the sensitive plate. A negative when developed from this screen is obtained in patterns corresponding to the patterns of the screen, and to the effect of the light as selected by the different colors of the screen. The part of this negative where covered by opaqued red lines will be transparent, and opaque where the blank lines are left. If now a piece of paper or other material, ruled in lines to correspond in color and alternation and to register with the lines of the screen and provided with a material sensitive to the action of light, be placed under and in contact with the negative, with the rotation of colors correct, the negative may be moved until the lines are parallel, and when the transparent lines in the place of the red register with the red lines in the paper and the other lines are covered with the opaque lines of the negative the registration is complete. This registering portion will be red to the view and the other portions may be disregarded. In this way simple color effects may be absolutely obtained, as one color is presented to view in the registering portion and the other colors entirely obscured or suppressed. The paper or other material used may be printed in the light to a picture in colors and toned or developed; or, if preferred, an opaque or bare section may be left the entire length of the screen, covering all colors, and the negative or positive will of course form a corresponding section. These lines and this effect on the negative may also be obtained by placing on or near the subject to be photographed an object, as a piece of paper, of the complementary color. Of red, this complementary color is of a bluish green. In this case also the line representing the red line will be transparent in the negative and the other lines opaque, and the register with the negative will be effected in the same manner; or, if preferred, the negative, after being produced by the screen, may thereafter be provided with blots, marks, or other characteristics—as, for instance, scratching out a portion of a line or pattern—by which facility in registering may be effected.

What I regard as new, and desire to secure by Letters Patent, is—

1. A negative or positive photographic plate made with recurring patterns—as dots, lines, figures—and having a portion where there is a fixed or invariable and distinctive characteristic which is produced in the sensitive material of the plate and by which the plate may thereafter be registered or adjusted in position in use.

2. A negative or positive photographic plate made with recurring patterns—as dots, lines, figures—produced by the action of different-colored light in regular alternating order, having a portion of its surface printed and developed for the purpose of registering by means of and with a transparent line or pattern in each series of lines or patterns.

3. A negative or positive photographic plate made with recurring patterns—as dots, lines, figures—produced by the action of different-colored light in regular alternating order, having a portion of its surface printed and developed for the purpose of registering by means of and with an opaque line or pattern in each series of lines or patterns.

4. A negative or positive photographic plate made with recurring patterns—as dots, lines, figures—produced by the action of different-colored light in regular alternating order, having a portion of its surface printed and developed for the purpose of registering by means of and with an opaque spot covering all lines and patterns in that spot.

5. A negative or positive photographic plate made with recurring patterns—as dots, lines, figures—produced by the action of different-colored light in regular alternating order having a portion of its surface printed and developed for the purpose of registering by means of and with a transparent spot covering all patterns in that spot.

JAMES W. McDONOUGH.

Witnesses:
THOMAS A. BANNING,
THOMAS B. McGREGOR.